W. M. BARRY.
EDUCATIONAL TOY.
APPLICATION FILED MAR. 20, 1920.

1,351,608.

Patented Aug. 31, 1920.
3 SHEETS—SHEET 2.

Walter M. Barry.
INVENTOR

BY Victor J. Evans
ATTORNEY

WITNESS:

W. M. BARRY.
EDUCATIONAL TOY.
APPLICATION FILED MAR. 20, 1920.
1,351,608.
Patented Aug. 31, 1920.
3 SHEETS—SHEET 3.
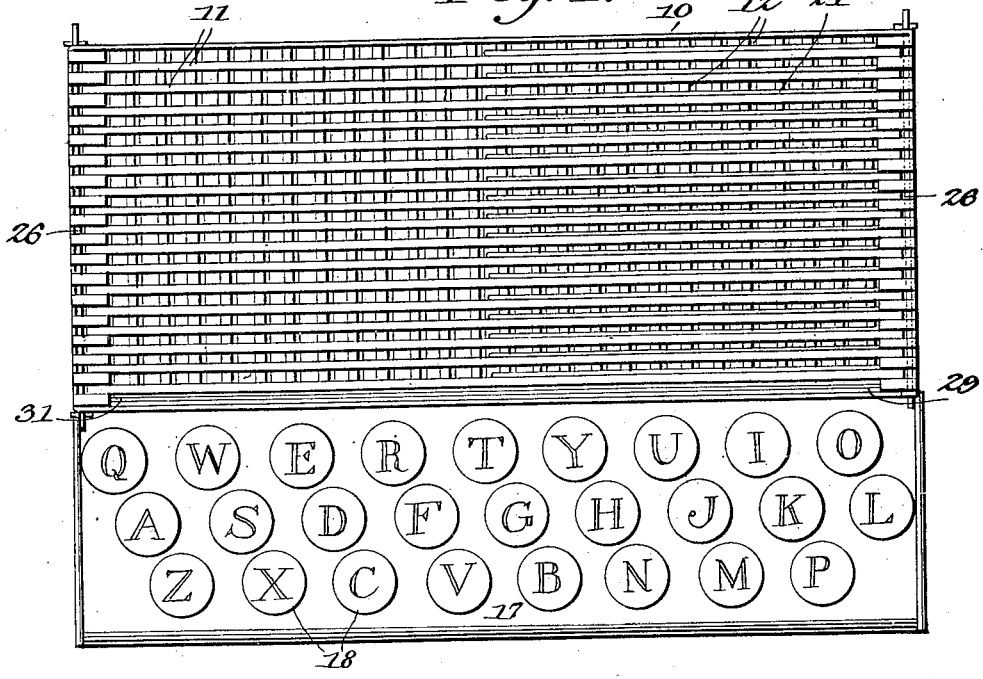
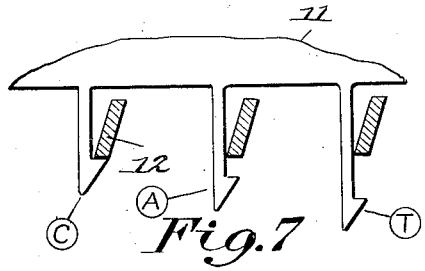
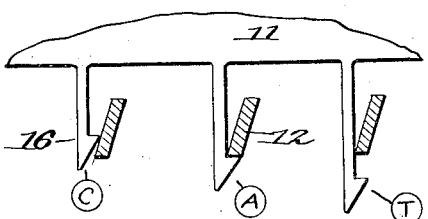
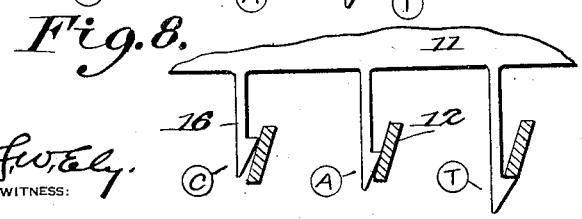
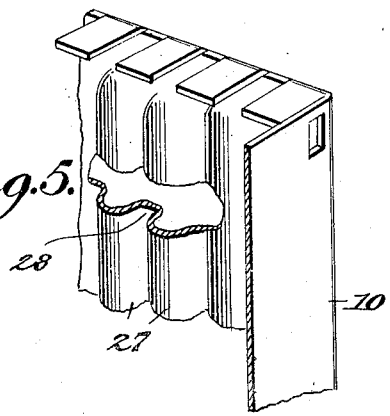
Walter M. Barry, INVENTOR

UNITED STATES PATENT OFFICE.

WALTER M. BARRY, OF NEW YORK, N. Y.

EDUCATIONAL TOY.

1,351,608.

Specification of Letters Patent. Patented Aug. 31, 1920.

Application filed March 20, 1920. Serial No. 367,355.

*To all whom it may concern:*

Be it known that I, WALTER M. BARRY, a citizen of the United States, residing at New York, in the county of New York and State of New York, have invented new and useful Improvements in Educational Toys, of which the following is a specification.

This invention relates to educational toys and is particularly intended for use to instruct or teach children.

Some of the objects of the invention are; to produce a device as characterized which embodies a permanently correlated key-board which includes keys that may be manipulated successively after the fashion of the keys of a typewriter for effecting the projection of symbol embodying panels from normally concealed positions to those of exposition; to produce a device as characterized which includes projectable picture embodying panels and an alphabet key-board which is permanently correlated as a part of the device, which key-board includes lettered keys embracing all the letters of the alphabet so that the field or range of that matter which is or those things which are depicted upon the panels is confined only to the expanse of the English language and may permit therefore the use of all the words of this language or any combination of letters, thereby giving the widest possible range to a device for teaching or instructing in conveying intelligence; to produce a device which includes symbol embodying panels which may be brought to view from their normally concealed positions by first consulting a chart which forms a part of the device and which chart may embody matter mentally suggestive or visually indicative or both as an instructing means to prompt a child in the manipulation of the several keys forming a part of the device; to produce symbol embodying panels for a device of this character which are reversible and therefore an advantage is derived as regards the expensiveness of the device; to produce a device of this character which has a comparatively large range of instruction in conveying intelligence, being very simple of construction, thoroughly reliable in use and one not apt to be easily rendered inoperative as well, in which:—

Fig. 4 is a plan view of the device.

Fig. 5 is a fragmentary sectional perspective view illustrating one of the features of construction of the casing forming a part of the device.

Figs. 6, 7 and 8 are views illustrating the manner in which a symbol embodying panel is released from its position of concealment.

Figure 1:
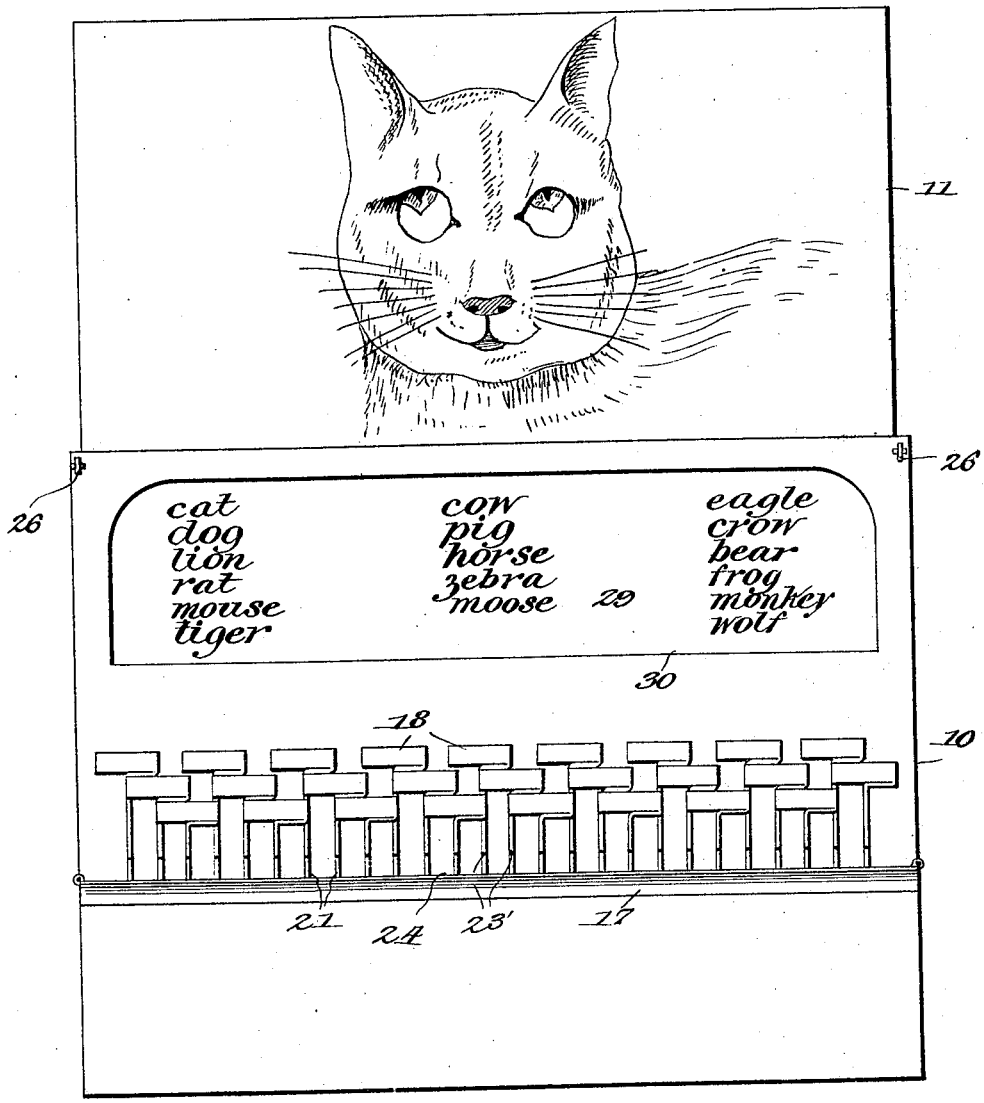
Figure 1 is a front elevation of the device; one of the symbol embodying panels is shown projected in an exposed position.
Figure 2:
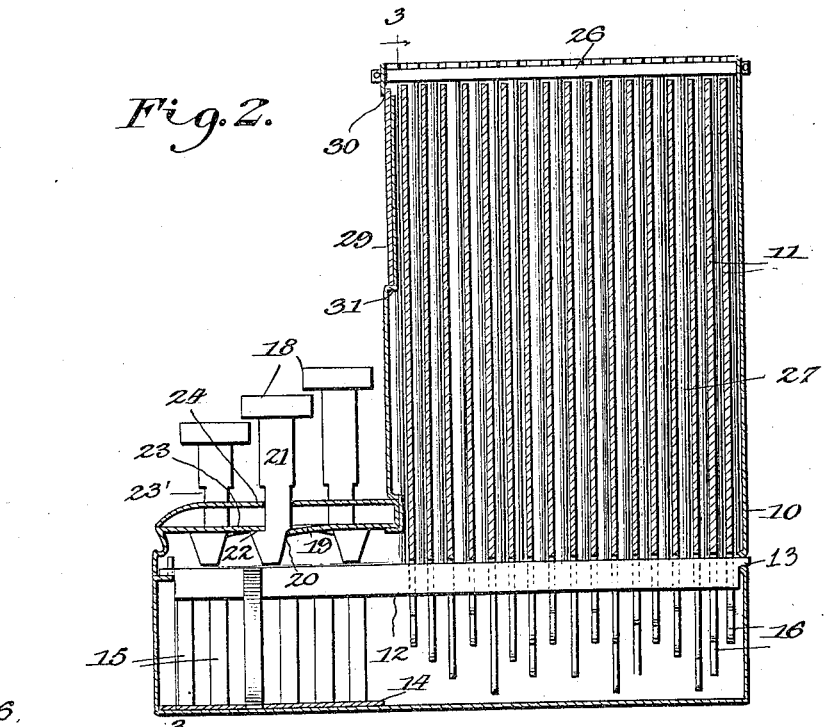
Fig. 2 is a transverse sectional view through the device.
Figure 3:
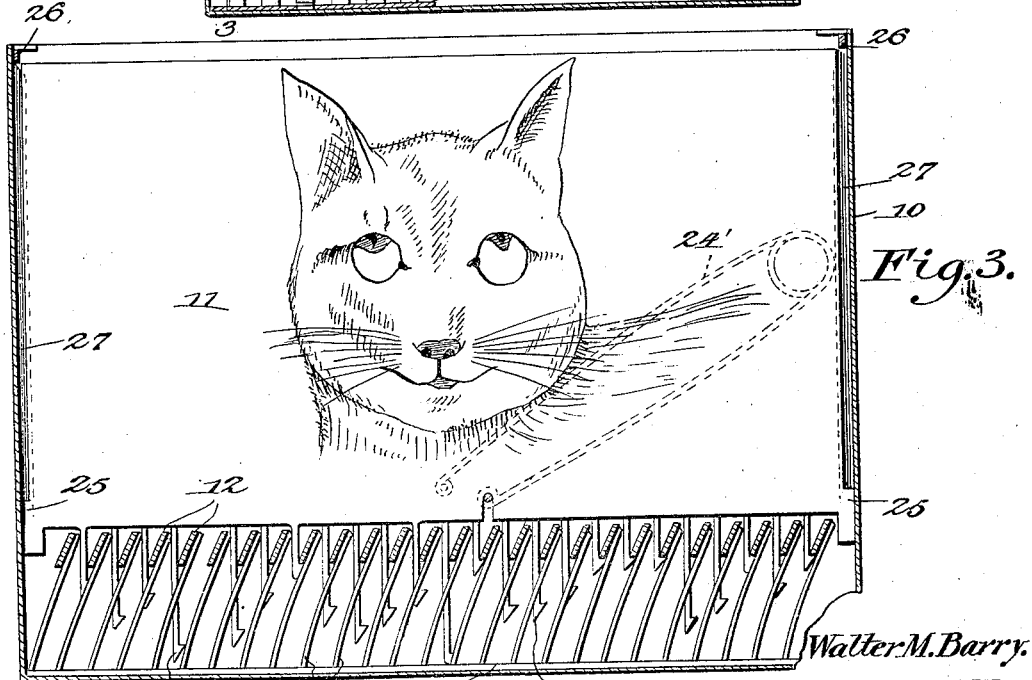
Fig. 3 is a sectional view taken on the line 3—3 of Fig. 2.

In the present disclosure of the invention there has been shown a device which embodies symbol embodying panels which may be projected singly from their normal positions of concealment within a casing to be exposed to view by the manipulation of a key or a selected group of keys forming a part of a key-board and wherein the keys embody the letters of the alphabet while the panels embody pictures of different animals. It is to be understood that such disclosure should in no way limit the invention to lettered keys and picture embodying panels.

Referring now to the drawing, it will be seen, that the device comprises among other things a casing 10 which is of a construction and of such configuration as to properly support the working parts forming a part of this device and also permitting their proper operation. Symbol embodying panels 11 are arranged within the casing 10 in spaced relation and each of these panels 11 embodies a picture which is different from the pictures on the other panels. All of these panels are held normally concealed within the casing 10 and are adapted to be projected therefrom singly so as to be exposed to view. The panels are arranged to slide in spaces formed between corrugations formed in the sides of the casing 10.

The means for holding the panels concealed within the casing 10 until a predetermined time consists of release bars 12 each of which is mounted to oscillate on pintles 13. These bars are arranged substantially at right angles with respect to the panels 11. Each of the bars 12 is spring pressed, the springs for normally exerting this pressure on each of the bars are struck up from a plate 14 which is secured to the bottom wall of the casing 10. The springs are designated by the numeral 15. Each panel 11 embodies escapement means in the nature of hooks 16. These hooks vary in number as regards each particular panel and the particular symbol depicted thereon and are so disposed as to engage certain predetermined bars 12 for a reason to appear. These bars 12 constitute a key actuated means which in conjunction with the hooks 16 serves as a holding and releasing means for the panels 11.

In order that certain predetermined bars may be actuated to release a particular panel there is provided a key-board 17 which embodies a plurality of keys 18 which are disposed throughout the key-board after the fashion of the key arrangement of an ordinary standard typewriter; there are 26 keys in all and each embodies one of the letters of the alphabet. One key is arranged with respect to one particular bar and controls the same. These keys are arranged for vertical movement and each is spring pressed as by the use of individual springs 19 which engage a shoulder 20 formed on the shank 21 of the key. Each shank 21 is provided with a shoulder 22 which normally engages the wall 23 forming a part of the key-board 17 to limit the upward movement of the key. The shank 21 of each key has a shoulder 23' which limits the downward movement of each key. The wall 24 of the key-board 17 with the wall 23 serves to steady and properly support the keys for movement. These keys are capable of individual movement and actuate the bars to move out of engagement with the hooks 16 thus permitting a particular panel to be projected from its normal position of concealment within the casing to one of exposition, inasmuch as each panel has correlated therewith a spring 24' one end of which is secured to the panel and the opposite end thereof which extends from the central convolution forming a part of the spring is secured to a fixed part of the casing. The panels are limited in their upward movement and this is accomplished by providing each panel with projections 25—25 at the lower side edges thereof which engage stop bars 26—26 which are removable so as to permit different sets of panels to be placed within the device from time to time in lieu of others. The casing 10 is corrugated to provide ribs 27 and spaces 28 between the ribs in which spaces the panels are adapted to freely slide.

In order that a child may be furnished with a knowledge as to just what symbols or pictures are embodied upon the several panels there is provided a chart 29 which is arranged in an opening 30 in the casing 10, the said chart being held in place by a portion of the front wall 31 which is bent backwardly and upwardly at the opening. This chart may embody significant matter in the nature of symbols or words which teach and prompt a child to manipulate a proper group of keys, for instance, in a case where words appear on the chart, the words of course, will be correctly spelled out and the child therefore is prompted to manipulate the keys properly in spelling a particular word with the result that the corresponding word picture embodied by a particular panel will be projected to view. As an example of the use of the device, and as an example wherein the child wishes to have the panel depicting the picture of a cat to appear, the keys C, A and T will be manipulated successively; C first A second and T third, and on reference to Figs. 6, 7 and 8 it will be seen that the manipulation of key C will cause the bar 12 to move out of engagement with the hook C thus permitting the panel 11 to move upwardly under the action of its spring 27 until the hook A engages its correlated bar 12; manipulation of the key A causes movement of the particular bar controlled by it to move out of engagement with the hook A thus permitting the panel 12 to move upwardly another degree until the hook T engages its correlated bar 12; manipulation of the key T will cause the particular bar 12 correlated therewith to move out of engagement with the hook T with the result that the panel 11 will be free to move under the action of its spring to an exposed position without the casing 10. In this way the whole 26 keys may be manipulated to permit the projection of but a single panel and in fact any symbol may be depicted upon a panel and the name with which it is referred to may be spelled out on the key-board regardless of the number of letters contained within the name. It will therefore be appreciated that the range of different panels that may be employed is practically unlimited.

While there has been shown the preferred embodiment of this invention it is to be understood that the right is reserved to make any and all changes, modifications and alterations within the scope of the claims hereunto appended.

What is claimed as new is:—

1. A device as characterized, including a casing, a plurality of projectable picture embodying panels, normally concealed within said casing, an operable key-board including spring pressed lettered keys embodying the alphabet permanently located on said casing, and means operable through the use of said key-board to expose a particular panel by permitting the same to move step by step.

2. A device as characterized including a casing, projectable symbol embodying panels normally concealed within said casing, panel release means, a key-board operable to actuate said means for the release of any particular one of said panels, and means for projecting such particular panel from its normal position of concealment to one of exposition by permitting the same to move step by step.

3. A device as characterized including a plurality of normally concealed step by step projectable picture embodying panels, panel holding and releasing means, including release spring pressed bars, and an alphabet key-board including manipulating keys arranged with respect to said bars to move the bars upon their manipulation to release the panels to projected exposed positions according as certain words are correctly spelled in use of said key-board.

4. A device as characterized including a plurality of normally concealed step by step projectable picture embodying panels, panel holding and releasing means, including released spring pressed oscillatory bars, and an alphabet key-board including manipulating keys arranged with respect to said bars to move the bars upon their manipulation to release the panels to projected exposed positions according as certain words are correctly spelled in use of said key-board.

5. A device as characterized including a plurality of normally concealed step by step projectable symbol embodying panels, panel holding and releasing means including spring pressed release bars, and a key-board including spring pressed manipulating keys, one key being arranged with respect to one of said bars, to move said bar in the release of a particular panel for its projection to a position of exposition.

6. A device as characterized including a plurality of normally concealed step by step spring projectable picture embodying panels, panel holding and releasing means including spring pressed release bars, and an alphabet key-board including spring pressed lettered manipulating keys, one key being arranged with respect to one of said bars, to move said bar in the release of a particular panel prior to its projection to a position of exposition.

7. A device as characterized including a plurality of normally concealed step by step spring projectable picture embodying panels, an alphabet key-board including lettered manipulating keys, panel holding and releasing means including spring pressed oscillatory release bars which are arranged between said panels and said keys, one key being arranged with respect to each of said bars so as to move the said bars to release a particular panel to be projected to a position of exposition.

8. A device as characterized including a plurality of normally concealed projectable panels each having symbols thereon, hooks arranged in staggered relation on each of said panels, release means correlated with said hooks and co-acting therewith to hold panels in their normally concealed position, and an alphabet key-board including lettered keys operable to actuate the release means for projection of said panels at random.

9. A device as characterized including a plurality of normally concealed projectable panels each having symbols thereon, hooks arranged in staggered relation on each of said panels, release means correlated with said hooks and co-acting therewith to hold panels in their normally concealed position, a key-board including symbol embodying keys operable to actuate the release means for the projection of said panels at random, and a chart removably arranged upon the device, the said chart embodying matter mentally suggestive of the matter on said panels and being instructive of the use of said key-board for the selective projection of said panels.

10. A device as characterized including a plurality of normally concealed spring projectable panels each having symbols thereon, hooks arranged in staggered relation on each of said panels, release means correlated with said hooks and co-acting therewith to hold panels in their normally concealed position, and an alphabet key-board including lettered keys operable to actuate the release means for the exposition of said panels at random singly.

11. A device as characterized including a plurality of normally concealed projectable panels each embodying different matter, hooks arranged in staggered relation on each of said panels, release means including oscillatory release bars which co-act with the hooks on said panels to hold the same in their normally concealed positions, and a key-board including symbol embodying keys operable to actuate said bars for the exposition of said panels to positions of exposition at random.

12. A device as characterized including a plurality of normally concealed spring projectable panels each embodying different matter, hooks arranged in staggered relation on each of said panels, release means including oscillatory release bars which co-act with the hooks on said panels to hold the same in their normal positions, and an alphabet key-board including lettered spring pressed keys operable to actuate said bars for the exposition of said panels to positions of exposition at random singly.

13. A device as characterized including a plurality of normally concealed spring projectable picture embodying panels, hooks arranged in staggered relation on each of said panels, an alphabet key-board including spring pressed keys, means including spring pressed oscillatory release bars which co-act with the hooks of each panel to hold said panels in their normally concealed positions, the keys being operable to oscillate said bars for the release and projection of a particular panel to a position of exposition.

14. A device as characterized including a plurality of releasable and projectable picture embodying panels, spring pressed oscillatory release bars, a hook or hooks carried by each of said panels, a certain hook or hooks being each respectively engaged by one of said bars at a predetermined time, means for moving the hooks into engagement with said bars, an alphabet key-board embodying manipulating keys each of which bears one letter of the alphabet, the operation of particular keys effecting the disengagement of particular hooks from particular bars to effect the projection of a particular panel to a position of exposition.

In testimony whereof I have affixed my signature.

WALTER M. BARRY.